(12) United States Patent
McDiarmid et al.

(10) Patent No.: US 8,533,151 B2
(45) Date of Patent: Sep. 10, 2013

(54) GENERATING A LOCAL COPY OF A VIRTUALIZED APPLICATION PACKAGE FROM A LOCAL INSTALLATION

(75) Inventors: Trevor William McDiarmid, Seattle, WA (US); Gurashish Singh Brar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 12/471,476

(22) Filed: May 26, 2009

(65) Prior Publication Data
US 2010/0306270 A1    Dec. 2, 2010

(51) Int. Cl.
*G06F 17/30* (2006.01)
(52) U.S. Cl.
CPC ............................... *G06F 17/30595* (2013.01)
USPC ........... 707/602; 707/601; 707/634; 707/667; 707/829
(58) Field of Classification Search
CPC ...................... G06F 17/30592; G06F 17/30595
USPC .................... 707/1, 100, 200, 601, 602, 610, 707/634, 661, 667, 698, 756, 796, 821, 829
See application file for complete search history.

(56) References Cited

U.S. PATENT DOCUMENTS

| | | | |
|---|---|---|---|
| 6,154,747 A | 11/2000 | Hunt | |
| 6,389,385 B1 | 5/2002 | King | |
| 7,062,567 B2 * | 6/2006 | Benitez et al. | 709/231 |
| 7,305,671 B2 | 12/2007 | Davidov et al. | |
| 7,565,495 B2 * | 7/2009 | Kleinschnitz et al. | 711/154 |
| 7,574,418 B1 * | 8/2009 | Patterson et al. | 707/999.001 |
| 7,735,057 B2 * | 6/2010 | Rachman et al. | 717/100 |
| 7,793,266 B2 * | 9/2010 | Alpern et al. | 717/127 |
| 7,890,689 B2 * | 2/2011 | Lam et al. | 711/6 |
| 8,112,392 B1 * | 2/2012 | Bunnell et al. | 707/625 |
| 8,370,835 B2 * | 2/2013 | Dittmer | 718/1 |

(Continued)

OTHER PUBLICATIONS

Xu, et al., "Towards Autonomic Virtual Applications in the In-VIGO System", 2005 Retrieved Mar. 31, 2009 at <<http://ieeexplore.ieee.org/stamp/stamp.jsp?arnumber=01498049>>, Proceedings of the Second International Conference on Autonomic Computing (ICAC'05), pp. 1-12.

Xu, et al., "Towards Autonomic Virtual Applications in the In-VIGO System", Retrieved at <<http://ieeexplore.ieee.org/stamp/stamp.jsp?arnumber=01498049>>, Proceedings of the Second International Conference on Autonomic Computing (*ICAC'05*), pp. 1-12, 2005.

*Primary Examiner* — Dangelino Gortayo
(74) *Attorney, Agent, or Firm* — Hope Baldauff, LLC (57) ABSTRACT

Technologies are described herein for generating a local copy of a virtualized application package from a local installation. An empty copy of the virtualized application package is generated from a skeleton file. The skeleton file contains a hash value computed from each data block in the virtualized application package. The component files of the application are retrieved from a virtual file system representation of the location installation of the application, and each component file is divided into one or more blocks of data. A hash value is computed for each block of data and the skeleton file is searched for a hash value corresponding to a data block of the virtualized application file that matches the hash value computed for each block of data. If a match is found, the block of data is copied to the corresponding data block of the empty copy of the virtualized application package.

15 Claims, 5 Drawing Sheets

(56) References Cited

U.S. PATENT DOCUMENTS

| | | |
|---|---|---|
| 2003/0145282 A1 | 7/2003 | Thomas et al. |
| 2004/0139309 A1* | 7/2004 | Gentil et al. ............... 713/1 |
| 2004/0199516 A1 | 10/2004 | Thames et al. |
| 2004/0250259 A1 | 12/2004 | Lauterbach et al. |
| 2008/0059631 A1* | 3/2008 | Bergstrom et al. ........... 709/224 |
| 2008/0222219 A1* | 9/2008 | Varadarajan ................ 707/204 |
| 2010/0037235 A1* | 2/2010 | Larimore et al. ............ 719/312 |
| 2010/0095380 A1* | 4/2010 | Fossen et al. ................ 726/24 |
| 2010/0235641 A1* | 9/2010 | Hickmott et al. ............ 713/170 |

* cited by examiner

GENERATING A LOCAL COPY OF A VIRTUALIZED APPLICATION PACKAGE FROM A LOCAL INSTALLATION

BACKGROUND

Application virtualization allows software applications to be deployed to users' computers from virtualized application packages maintained on a virtual application server. Application virtualization may remove the requirement for an application to be installed locally on a user's computer. Instead, a virtual application runtime may execute on the computer and stream the application components from the virtualized application package on the server.

Application virtualization generally requires that the computer initially be connected to the virtual application server in order to execute the application and retrieve components from the virtualized application package. In a laptop computer or other computer that is often disconnected from the network, it may be desirable for a local copy of the virtualized application package to be available, for use in the initial execution the application or the retrieval of additional components, for example. If a computer has previously executed the application from the virtual application server, it may contain local copies of most, if not all, of the component files of the application. However, generating a copy of the original virtual application package from these local copies may be difficult, and may require that the entire virtual application package be retrieved from the virtual application server a second time, increasing network utilization.

It is with respect to these considerations and others that the disclosure made herein is presented.

SUMMARY

Technologies are described herein for generating a local copy of a virtualized application package from a local installation. Utilizing the technologies described herein, a copy of a virtualized application package can be generated from application component files presented in a virtual file system representation of a local installation of the application on a computer. The local copy of the virtualized application package can then be utilized by the computer or another computer to execute the application without having to be connected to a virtual application server. Generating the local copy of the virtualized application package from the local installation relieves the computer from having to retrieve the entire virtual application package from the virtual application server a second time, thus saving the additional network bandwidth utilization.

According to one embodiment, an empty copy of the virtualized application package is generated from a skeleton file containing hash values corresponding to data blocks storing the contents of the component files in the original virtualized application package. The component files of the application are then retrieved from the virtual file system representation of the local installation, and each component file is divided into one or more blocks of data. A hash value is then computed for each block. The skeleton file is searched for a hash value that matches the hash value computed for each block of data. If a match is found, the block of data is copied to the corresponding data block of the empty copy of the virtualized application package.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for generating a local copy of a virtualized application package utilizing the files from a virtual file system representation of a local installation of the application. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
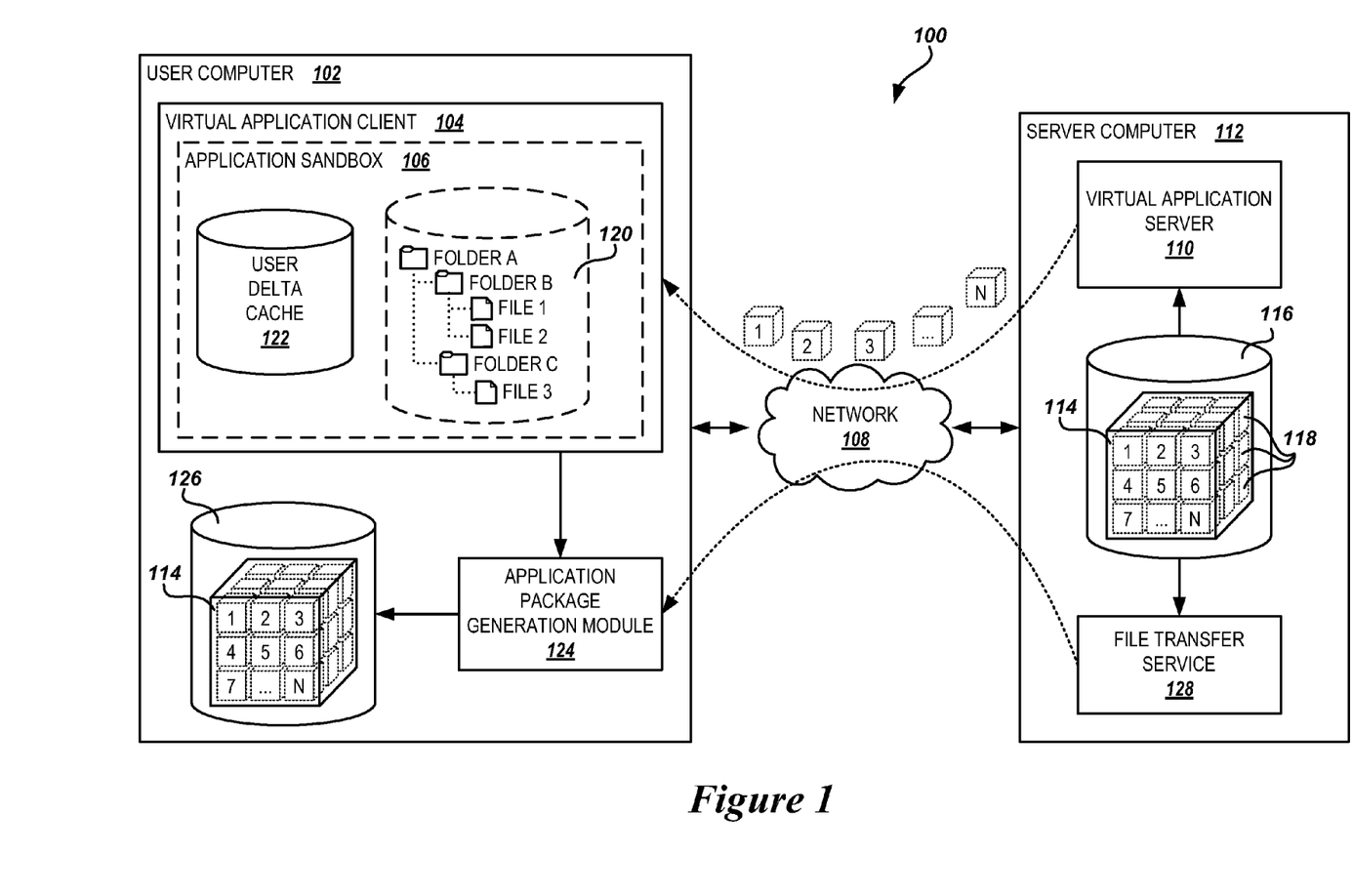
FIG. 1 is a block diagram showing aspects of an illustrative operating environment and several software components provided by the embodiments presented herein.

FIG. 1 shows an illustrative operating environment 100 including several software components for generating a local copy of a virtualized application package from a local installation, according to embodiments provided herein. The environment 100 includes a user computer 102. The user computer 102 may be a personal computer ("PC"), a desktop workstation, a laptop, a notebook, a personal digital assistant ("PDA"), an application server, a Web server hosting Web-based application programs, or any other computing device that can execute application programs.

The user computer 102 executes a virtual application client 104. The virtual application client 104 may allow the user computer 102 to launch and execute application software that has not been previously installed on the computer. The virtual application client 104 may instead stream the components of the application software in real-time over a network 108 from a virtual application server 110 executing on a server computer 112. The virtual application client 104 and virtual application server 110 may be based upon the MICROSOFT® APP-V technology from MICROSOFT Corporation of Redmond, Wash the CITRIX XENAPP™ technology from CITRIX SYSTEMS Inc. of Fort Lauderdale, Fla., or any other application streaming and virtualization platform or technologies. The network may be a local-area network ("LAN"), a wide-area network ("WAN"), the Internet, or any other networking topology that connects the user computer 102 to the virtual application server 110.

The components of the application software may be stored in a virtualized application package 114 located on a storage device 116 accessible by the server computer 112. According to embodiments, the virtualized application package 114 consists of a number of blocks 118 of data that contain application structure information as well as the individual component files and other elements of the application, as will be described in detail below in regard to FIG. 2.

The blocks 118 in the virtualized application package 114 may be sequenced such that the core components of the application software are streamed to the virtual application client 104 first, thereby allowing the application to be started quickly by the user computer 102. Once the application is started, the blocks 118 containing common functions are streamed in order of priority. If a specific function of the application software is requested by the user computer 102, then the sequence of streaming the blocks 118 may be modified to satisfy the request. Otherwise, the full application may be streamed from the virtual application server 110 to the virtual application client 104 over time in the background.

The virtual application client 104 may create a separate virtual environment, referred to herein as an application sandbox 106, to execute each application streamed from the virtual application server 110. The application sandbox 106 allows the components of the application software to execute in isolation from the remainder of the system. For example, the application software may execute using its own version of common library files, without a danger of the library files being overwritten by the installation of another software package or an update to the operating system ("OS") of the user computer 102. In addition, any changes made by the initialization or execution of the application software are further isolated to the application sandbox 106. If a user of the application software modifies configuration files or registry entries related to the application, these changes may only be reflected in the particular application sandbox 106 in which the application software is executing.

According to embodiments, the virtual application client 104 presents the component files and other elements of the application software to the OS and other programs executing on the user computer 102 through a virtual file system representation 120. The virtual file system representation 120 may appear to the OS and the other programs as a local installation of the application, including the traditional file and folder structure. The OS and other programs executing on the computer may interact with these application component files through the file system provided by the OS. This allows traditional application software to be packaged, streamed, and virtualized in the manner presented herein without requiring changes to the structure of the application.

The virtual file system representation 120 may initially reflect all the files in a typical local installation of the application software, even though some of the actual application component files have not yet been streamed from the virtual application server 110 to the virtual application client 104. If the application or another program executing on the user computer 102 requests a specific component file from the virtual file system representation 120 which has not yet been received, the virtual application client 104 will request that the required blocks 118 from the virtualized application package 114 be streamed in real-time from the virtual application server 110 to satisfy the request.

The virtual application client 104 may maintain any local changes made to component files or other elements during initialization or execution of the application software in the application sandbox 106 in a user delta cache 122. The component files presented through the virtual file system representation 120 will include these local changes. In this way, local changes may be persisted across different executions of the application software. For example, if a particular application maintains personal user settings in an application configuration file, the blocks 118 of data streamed from the virtual application server 110 to the virtual application client 104 may contain the file with default configuration settings. Any changes made to the application configuration file by a user while the application is executing in the application sandbox 106 will be stored in the user delta cache 122. When the application or another program executing on the user computer 102 reads the application configuration file from the virtual file system representation 120, the virtual application client 104 will combine the user changes stored in the user delta cache 122 with the blocks 118 from the virtualized application package 114 representing the original file to present the modified version of the file.

It will be appreciated that, even though all of the blocks 118 from the virtualized application package 114 for a particular application may have been streamed to the virtual application client 104 on the user computer 102, it may not be possible for a program executing on the computer to access the original contents of the virtualized application package 114. This is because access to the contents may be limited to the virtual file system representation 120, which presents the individual component files and other elements of the application including local modifications. It may be desired, however, to produce a local copy of the original virtualized application package 114. For example, the local copy of the virtualized application package 114 may be copied to another computer, such as a laptop, so that that the application software may be executed by the laptop even when the laptop is not connected to the network 108. Or, the user computer 102 may need a local copy of the virtualized application package 114 in order to repair the local installation of the application while being used offline.

According to embodiments, the user computer 102 also includes an application package generation module 124 configured to generate a local copy of the virtualized application package 114 from the local installation of the application presented through the virtual file system representation 120. The application package generation module 124 may be a component of the application software, streamed to the virtual application client 104 and executed in the application sandbox 106, or it may be a separate application module installed and executed on the user computer 102.

As will be described in detail below in regard to FIGS. 4A and 4B, the application package generation module 124 accesses the individual component files and other elements of the software application through the virtual file system representation 120 and generates a local copy of the original virtualized application package 114 on a local storage device 126. In one embodiment, the application package generation module 124 may have to retrieve specific blocks 118 of the virtualized application package 114 from the server computer 112 in order to complete the generation of the local copy of the virtualized application package 114. The application package generation module 124 may request the specific blocks 118 of the virtualized application package 114 directly from the virtual application server 110, or it may utilize a file transfer service 128 that has access to the virtualized application package 114 stored on the server computer 112. It will be appreciated that any of a number of file transfer services 128 known in the art that support retrieval of a byte range of a file may be utilized by the application package generation module 124 to retrieve the blocks of the virtual application package 114.

Figure 2:
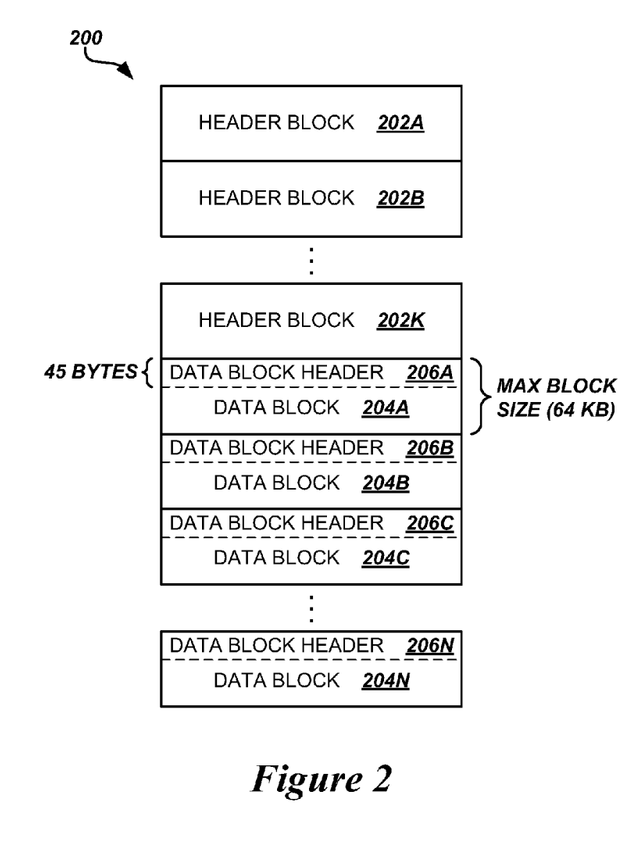
FIG. 2 is a block diagram showing an illustrative data structure for a virtualized application package, according to embodiments described herein.

FIG. 2 shows one example of a file layout 200 of a virtualized application package 114, according to embodiments. As described above, the virtualized application package 114 may consist of a number of blocks 118 of data. Theses blocks 118 may be further divided into header blocks 202A-202K (also referred to herein as header blocks 202) and data blocks 204A-204N (also referred to herein as data blocks 204).

The first part of the virtualized application package 114 may contain one or more header blocks 202. The header blocks 202 may contain specific information regarding the properties and structure of the application software contained in the virtualized application package 114, such as user access information, version information, execution requirements, and the file and folder structure of the installation to be reproduced by the virtual application client 104. In addition, the header blocks may map the application component files to their respective data blocks 204, describe in detail below.

There may be a fixed number of header blocks 202 in every virtualized application package 114. Alternatively, the number of header blocks 202 may depend on the amount of header data stored in a particular virtualized application package 114. Further, each of the header blocks 202 may be of a fixed size, for example 64KB, or the size of the header blocks 202 may be variable. It will be appreciated that the number, size, and contents of the header blocks 202 may vary based on the application streaming technology utilized by the virtual application client 104 and the virtual application server 110. In addition, the contents of the header blocks 202 are likely not re-creatable from the virtual file system representation 120 on the user computer 102, even after the virtualized application package 114 has been streamed to the computer.

As shown in the exemplary file layout 200, the header blocks 202 in the virtualized application package 114 are followed by a number of data blocks 204. The data blocks 204 contain the contents of the various component files and other elements of the application. The contents of the data blocks 204 may be compressed to improve the efficiency of streaming the blocks to the virtual application client 104. The data blocks 204 may vary in size, but each block is less than a maximum block size, for example 64KB.

According to one embodiment, a component file of the application is broken down into one or more blocks of the maximum block size or less, and then each block is compressed using a lossless compression algorithm, such as BZIP2. The resulting compressed data blocks 204 are then added to the virtualized application package 114. It will be appreciated that this approach results in each data block 204 containing all or a portion of only one component file, while one component file may occupy several data blocks 204. While FIG. 2 shows a relatively similar number of header blocks 202 and data blocks 204, it will be further appreciated that the number of data blocks 204 may far exceed the number of header blocks 202 in the virtualized application package 114 for a typical application.

Each data block 204 may also contain a data block header 206A-206N (also referred to herein as data block header 206). In one embodiment, the data block header 206 contains information regarding the size and position within the virtualized application package 114 of the corresponding data block 204. The data block header 206 may also contain other information regarding the corresponding data block 204, such as an identifier of the component file to which the data block belongs and the uncompressed size of the data stored in the block. The data block header 206 may be of a fixed size, such as 45 bytes, depending on the data contained therein.

Figure 3:
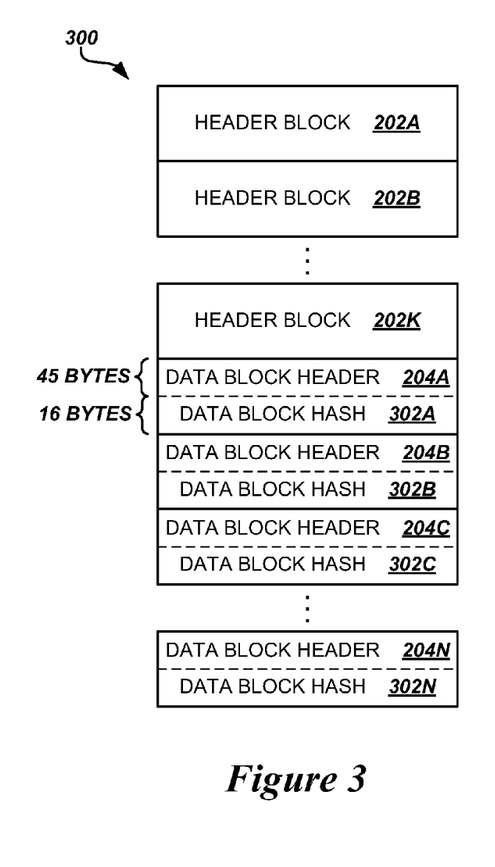
FIG. 3 is a block diagram showing an illustrative data structure for an application package skeleton file, according to embodiments described herein.

FIG. 3 shows a layout of a virtualized application package skeleton file 300 corresponding to the virtualized application package 114 shown in FIG. 2, according to embodiments. The skeleton file 300 is utilized by the application package generation module 124 to generate an "empty" virtualized application package as well as to map compressed data blocks from component files of the application into the local copy of the virtualized application package 114, as will be explained in detail below in regard to FIGS. 4A and 4B.

As shown in FIG. 3, the skeleton file 300 contains the same header blocks 202A-202K as the corresponding virtualized application package 114. Following the header blocks 202, for each of the data blocks 204A-204N in the corresponding virtualized application package 114, the skeleton file 300 includes a fixed size block of data containing the data block header 206A-206N from the corresponding data block 204A-204N, and a data block hash 302A-302N (also referred to herein as data block hash 302). The data block hash 302A-302N contains a hash value computed from the compressed data contained in the corresponding data block 204A-204N.

According to embodiments, the skeleton file 300 may be generated from the corresponding virtualized application package 114 before the application is made available for streaming by the virtual application server 110. Alternatively, the skeleton file 300 may be constructed simultaneously with the packaging of the application software into the virtualized application package 114. The data block hashes 302 may be computed using a hashing algorithm that results in a hash value of sufficient length such that each data block hash value represents a nearly unique identifier for the corresponding data block 204 in the virtualized application package 114.

According to one embodiment, the data block hashes 302 are computed using the MD5 algorithm resulting in a 128-bit (16 byte) hash value. It will be appreciated that any number of hashing algorithms could be utilized in computing the data block hash 302 for each of the data blocks 204 in the virtualized application package 114. It will be further appreciated that, because the skeleton file 300 contains only the data block hashes 302 and not the full data blocks 204, the skeleton file 300 may be significantly smaller in size than the corresponding virtualized application package 114. The skeleton file 300 may be retrieved by the application package generation module 124 from the server computer as a separate file, or the skeleton file may be appended to the end of the virtual application package 114 on the server.

Figure 4A:
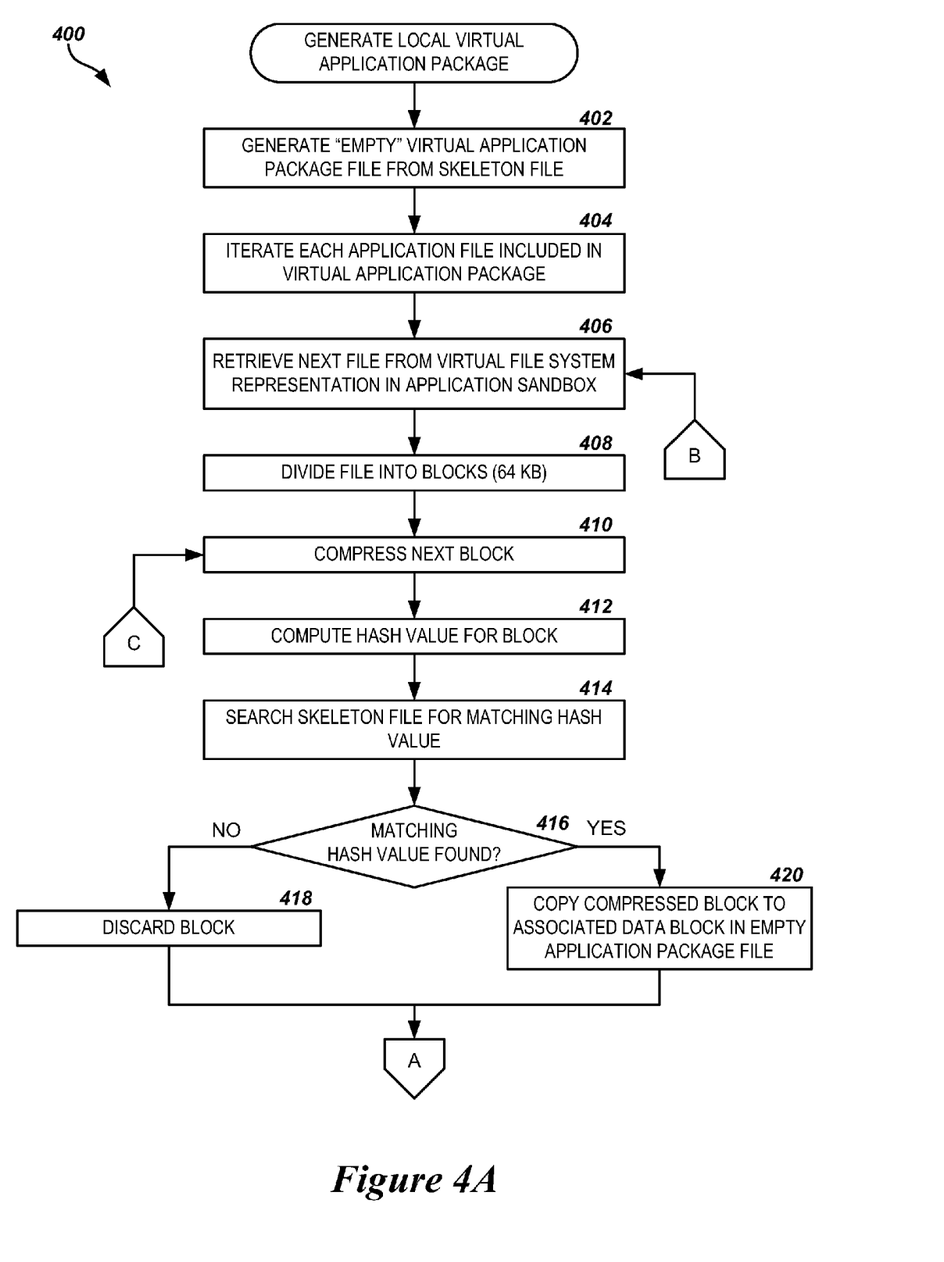
FIGS. 4A and 4B are flow diagrams showing one method for generating a local copy of a virtualized application package from a local installation, according to embodiments described herein.
Figure 4B:
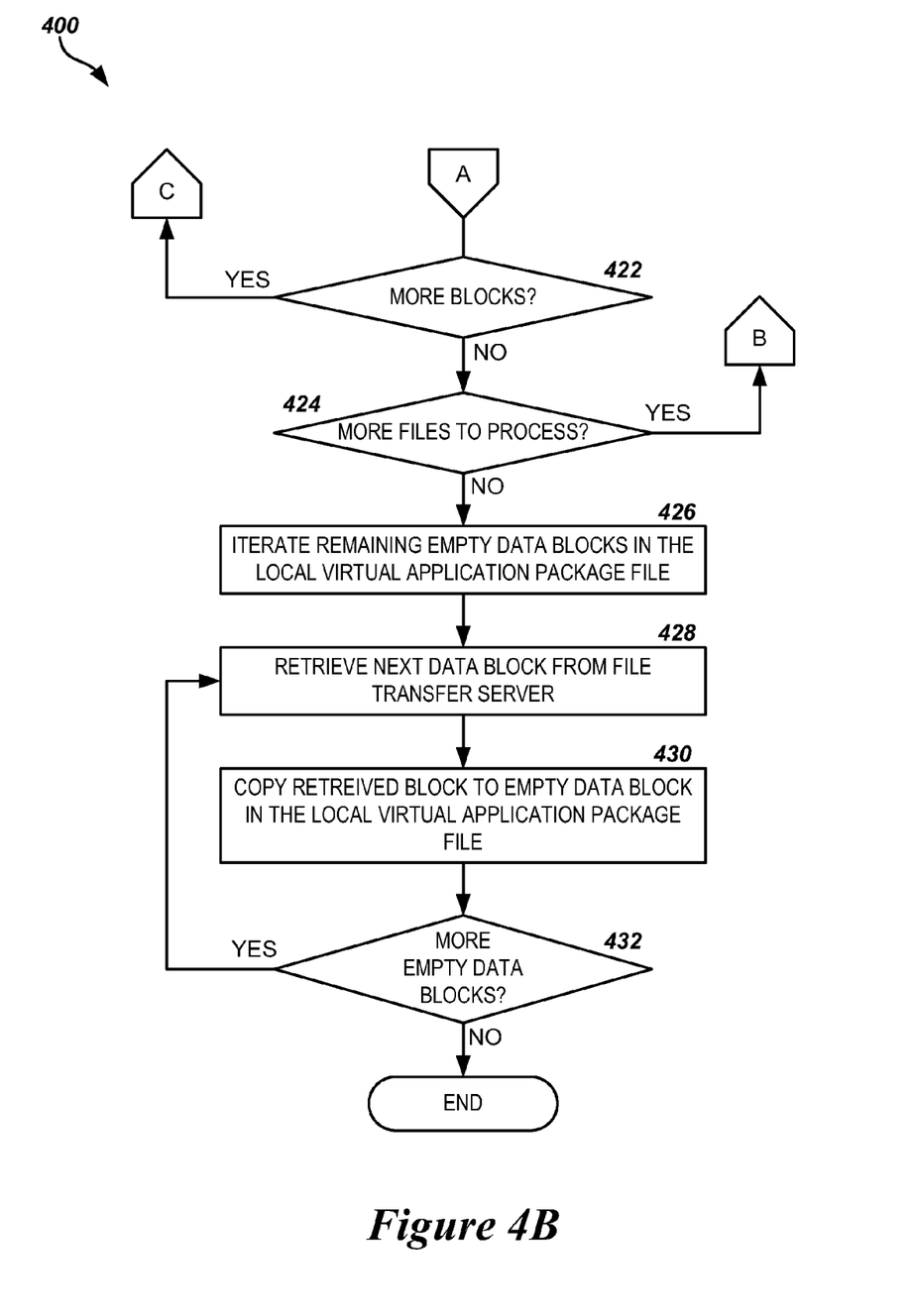

Referring now to FIGS. 4A and 4B, additional details will be provided regarding the embodiments presented herein. It should be appreciated that the logical operations described with respect to FIGS. 4A and 4B are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIGS. 4A and 4B illustrate a routine 400 for generating a local copy of the original virtualized application package 114 from the virtual file system representation 120 and the corresponding skeleton file 300 described above in regard to FIG. 3. The routine 400 begins at operation 402 depicted in FIG. 4A, where the application package generation module 124 generates an "empty" copy of the virtualized application package 114 on the local storage device 126 of the user computer 102. The empty application package is generated from the skeleton file 300.

The application package generation module 124 first copies the header blocks 202A-202K from the skeleton file 300 to the empty application package. Then, the application package generation module 124 creates a data block 204 in the empty package for each data block header 206 and data block hash 302 pair in the skeleton file 300. Because the data block header 206 contains information regarding the size of the corresponding data block 204, the application package generation module 124 may reserve space for the entire data block but only copy the data block header 206 from the skeleton file 300 to the empty application package.

From operation 402, the routine 400 proceeds to operation 404, where the application package generation module 124 iterates each component file of the application software that is to be included in the local copy of the virtualized application package 114. The application package generation module 124 may simply iterate through every file in the virtual file system representation 120, or it may utilize an inventory of files known to be in the application package to drive the process.

The routine 400 proceeds from operation 404 to operation 406, where the application package generation module 124 retrieves the first component file to process from the virtual file system representation 120 in the application sandbox 106. As described above, every component file may be represented in the virtual file system representation 120, even if the blocks 118 of the virtualized application package 114 containing the component file have not yet been streamed to the virtual application client 104. When the application package generation module 124 attempts to access the component file, if it has not yet been streamed to the client, the virtual application client 104 will request that the corresponding blocks 118 be streamed from the virtual application server 110.

Next, the routine 400 proceeds from operation 406 to operation 408, where the application package generation module 124 divides the component file into blocks based on the maximum block size of the virtualized application package 114. It will be appreciated that the last block of the file may not be the full maximum block size. The routine 400 then proceeds to operation 410, where the application package generation module 124 compresses the first block of the component file, utilizing the same compression algorithm utilized in the creation of the original virtualized application package 114 on the server computer 112. The compression algorithm may be known to the application package generation module 124, or the algorithm may be determined by reading information from the header blocks 202 of the empty application package. According to one embodiment, the application package generation module 124 utilizes the BZIP2 compression scheme to compress the data blocks.

From operation 410, the routine 400 proceeds to operation 412, where the application package generation module 124 computes a hash value for the compressed block using the same hashing algorithm utilized to generate the skeleton file 300. According to one embodiment, the MD5 hashing algorithm is used, producing a 128-bit hash value. Next, the routine 400 proceeds to operation 414, where the application package generation module 124 searches the skeleton file 300 for a data block hash 302 having the same value as the hash value calculated for the block. If, at operation 416, no matching data block hash 302 is found, then the routine 400 proceeds to operation 418, where the compressed block is discarded. A compressed block having no matching data block hash 302 in the skeleton file 300 is likely due to a component file that has been modified locally, as will be discussed below in regard to operation 426.

If, however, a matching data block hash 302 is found in the skeleton file 300, the routine 400 proceeds to operation 420, where the compressed block is copied into the data block 204 of the empty virtualized application package file corresponding to the matching data block hash 302 in the skeleton file 300. In a further embodiment, the length of the compressed block may be checked against the length of the compressed data specified in the data block header 206 of the matching data block 204 to further verify that the compressed block should be copied into the data block. It will be appreciated that there is a possibility of two, identical component files or other elements existing in an application package, resulting in identical hash values calculated from the corresponding blocks of data. Therefore, even after finding a first matching data block hash 302, the application package generation module 124 may continue to search the skeleton file 300 for any remaining matching data block hash values.

The routine 400 proceeds from operation 418 or operation 420 to operation 422, as shown in FIG. 4B, where the application package generation module 124 determines if there are more blocks from the current component file to be processed. If more blocks exist, then the routine 400 returns to operation 410 where the routine is repeated for the next block until all blocks of the current component file have been processed. Once all blocks of the current component file have been processed, the routine 400 proceeds from operation 422 to operation 424, where the application package generation module 124 determines if there are more component files to be included in the local copy of the virtualized application package 114. If more files are to be processed, then the routine 400 returns to operation 406 where the routine is repeated for the next component file until all component files of the application package have been processed.

Once all component files to be included in the local copy of the virtualized application package 114 have been processed, the routine 400 proceeds from operation 424 to operation 426, where the application package generation module 124 iterates through any remaining empty data blocks 204 in the local copy of the virtualized application package 114. It will be appreciated that after processing all the components files in the application inventory or presented through the virtual file system representation 120, the local copy of the virtualized application package 114 will be substantially complete. However, as discussed above in regard to FIG. 1, the virtual application client 104 maintains any local changes made to component files or other elements during initialization or execution of the application software in the user delta cache 122. Component files accessed through the virtual file system representation 120 are presented including these local changes.

Therefore, if a component file has been changed locally, when the application package generation module 124 retrieves the file, it will include the local changes from the user delta cache 122. This may result in the hash values computed for one or more of the compressed blocks corresponding to the component file not have matching data block hash 302 values in the skeleton file 300. Accordingly, once all of the component files have been processed, there may be a few remaining empty data blocks 204 in the local copy of the virtualized application package 114 corresponding to those component files with local changes.

At operation 426, the application package generation module 124 iterates through these remaining empty data blocks 204 in the local copy of the virtualized application package 114. From operation 426, the routine proceeds to operation 428, where the application package generation module 124 retrieves the data block 204 from the server computer 112 containing the original virtualized application package 114 corresponding to the first empty data block in the local copy of the virtualized application package 114.

In one embodiment, the application package generation module 124 utilizes a file transfer service 128 located on the server computer 112 to retrieve a byte range from the original virtualized application package 114. The byte range to retrieve can be ascertained from the information stored in the data block header 206 regarding the size and position within the original virtualized application package 114 of the data block 204, as discussed above in regard to FIG. 2. In further embodiments, the application package generation module 124 may utilize other methods to retrieve the data block 204 from the original virtualized application package 114, including requesting the block from the virtual application server 110. It will be appreciated that the process of retrieving only missing data blocks 204 uses less network resources than would be used by retrieving the entire file of which the missing data block is a part.

From operation 428, the routine 400 proceeds to operation 430 where the application package generation module 124 copies the retrieved data block 204 to the empty data block in the local copy of the virtualized application package 114. The routine then proceeds from operation 430 to operation 432, where the application package generation module 124 determines if more empty data blocks 204 exist in the local copy of the virtualized application package 114. If more empty data blocks 204 exist, then the routine 400 returns to operation 428 where the routine is repeated for the next empty data block 204, until all the empty data blocks have been retrieved from the server computer 112. Once no more empty data blocks 204 exist in the local copy of the virtualized application package 114, the routine 400 ends.

It will be appreciated that the routine 400 described above could be used to generate local copies of other types of file packages, beyond the virtualized application package 114 described above. For example, given a skeleton file 300 of the appropriate structure and containing the appropriate header information and data block hashes, a local copy of a backup file created by a backup program could be recreated from the associated files in the file system. In another example, a local copy of an archive file, such as a ZIP file, could be recreated using the method described above. It is intended that this application include all such generations of a local copy of a file package from a corresponding skeleton file containing data block hashes and files from a file system.

Figure 5:
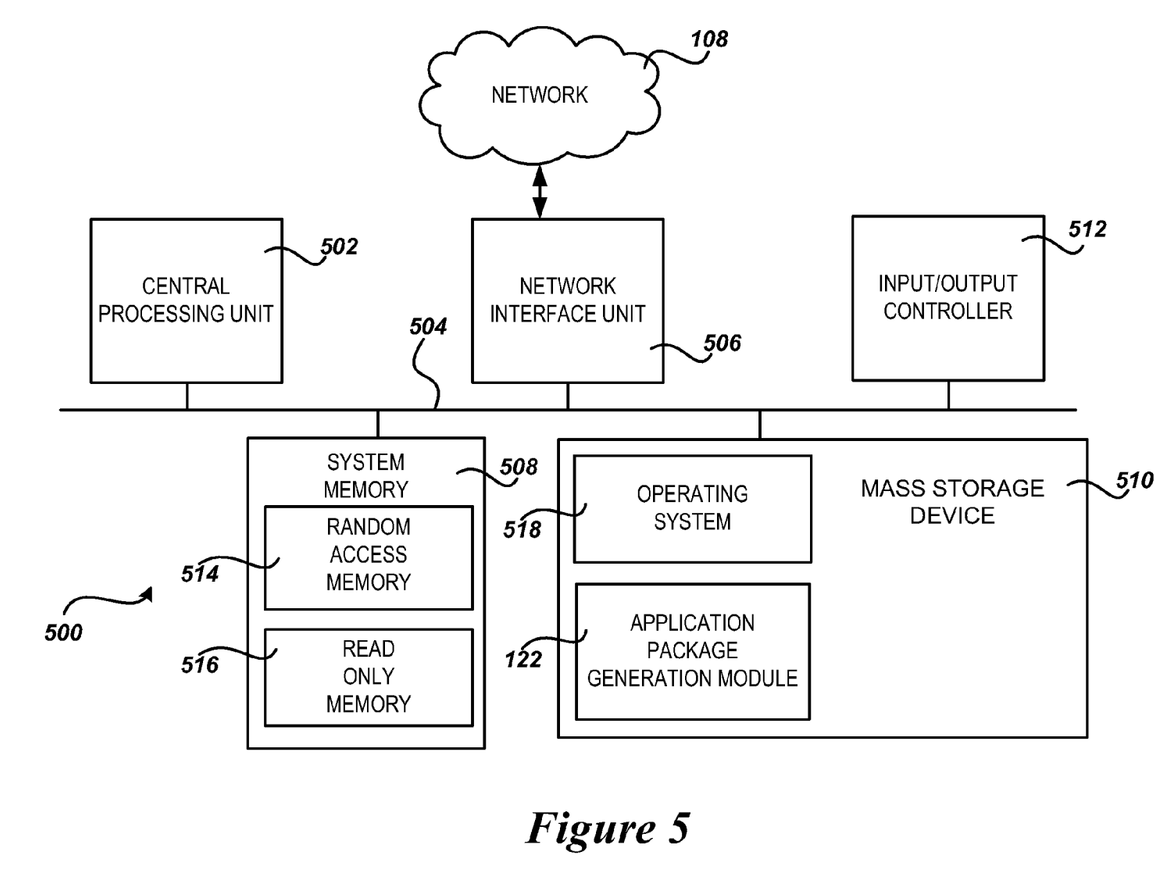
FIG. 5 is a block diagram showing an illustrative computer hardware and software architecture for a computing system capable of implementing aspects of the embodiments presented herein.

FIG. 5 shows an example computer architecture for a computer 500 capable of executing the software components described herein for generating a local copy of a virtualized application package from a local installation, in the manner presented above. The computer architecture shown in FIG. 5 illustrates a conventional computing device, PDA, digital cellular phone, communication device, desktop computer, laptop, or server computer, and may be utilized to execute any aspects of the software components presented herein described as executing on the user computer 102, server computer 112, or other computing platform.

The computer architecture shown in FIG. 5 includes a central processing unit ("CPU") 502. The CPU 502 may be a standard central processor that performs the arithmetic and logical operations necessary for the operation of the computer 500. The CPU 502 performs the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements. The computer 500 may include a multitude of CPUs 502.

The computer architecture further includes a system memory 508, including a random access memory ("RAM") 514 and a read-only memory 516 ("ROM"), and a system bus 504 that couples the memory to the CPU 502. A basic input/output system containing the basic routines that help to transfer information between elements within the computer 500, such as during startup, is stored in the ROM 516. The computer 500 also includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 provides non-volatile storage for the computer 500. The computer 500 may store information on the mass storage device 510 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 500 may store information to the mass storage device 510 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this discussion. The computer 500 may further read information from the mass storage device 510 by detecting the physical states or characteristics of one or more particular locations within the mass storage device.

As mentioned briefly above, a number of program modules and data files may be stored in the mass storage device 510 and RAM 514 of the computer 500, including an operating system 518 suitable for controlling the operation of a computer. The mass storage device 510 and RAM 514 may also store one or more program modules. In particular, the mass storage device 510 and the RAM 514 may store the application package generation module 124, which was described in detail above in regard to FIG. 1. The mass storage device 510 and the RAM 514 may also store other types of program modules or data.

In addition to the mass storage device 510 described above, the computer 500 may have access to other computer-readable media to store and retrieve information, such as program modules, data structures, or other data. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 500.

The computer-readable storage medium may be encoded with computer-executable instructions that, when loaded into the computer 500, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 500 by specifying how the CPU 502 transitions between states, as described above. According to one embodiment, the computer 500 may have access to computer-readable storage media storing computer-executable instructions that, when executed by the computer system, perform the routine 400, described above in regard to FIGS. 4A and 4B.

According to various embodiments, the computer 500 may operate in a networked environment using logical connections to remote computing devices and computer systems through a network 108. The computer 500 may connect to the network 108 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of input devices, including a keyboard, a mouse, a touchpad, a touch screen, an electronic stylus, or other type of input device. Similarly, the input/output controller 512 may provide output to a display device, such as a computer monitor, a flat-panel display, a digital projector, a printer, a plotter, or other type of output device.

Based on the foregoing, it should be appreciated that technologies for generating a local copy of a virtualized application package from a local installation are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer, comprising:
a processor; and
a local storage device containing computer-executable instructions that, when executed by the processor, cause the computer to
generate a local copy of a virtualized application package from a skeleton file and a virtual file system representation of a local installation of an application associated with the virtualized application package,
wherein the virtualized application package comprises one or more data blocks containing a contents of one or more component files of the application,
wherein the skeleton file comprises a data block header and data block hash pair corresponding to each of the one or more data blocks in the virtualized application package, the data block hash computed from the contents of the corresponding data block in the virtualized application package,
wherein the skeleton file does not contain the contents of the one or more data blocks, and
wherein generating the local copy of the virtualized application package comprises
generating an empty copy of the virtualized application package on the local storage device from the skeleton file, the empty copy of the virtualized application package comprising an empty data block corresponding to each data block header and data block hash pair in the skeleton file,
for each of the one or more component files of the application, dividing the component file into one or more blocks of data,
for each of the one or more blocks of data, computing a hash value for the block of data,
searching the skeleton file for a data block hash matching the hash value computed for the block of data,
upon locating a matching data block hash in the skeleton file, copying the block of data to the empty data block of the empty copy of the virtualized application package corresponding to the data block header and data block hash pair from the skeleton file, and
upon not locating a matching data block hash in the skeleton file, discarding the block of data.

2. The computer of claim 1, wherein the virtualized application package further comprises one or more header blocks, wherein the skeleton file further comprises the one or more header blocks from the virtualized application package, and wherein generating the empty copy of the virtualized application package further comprises copying the one or more header blocks from the skeleton file to the empty copy of the virtualized application package.

3. The computer of claim 1, wherein each of the one or more data blocks in the virtualized application package are compressed using a compression algorithm, and wherein the block of data is compressed using the compression algorithm before computing a hash value for the block of data.

4. The computer of claim 3, wherein the compression algorithm is the BZIP2 compression algorithm.

5. The computer of claim 1, wherein the hash value for the block of data and the data block hash in the skeleton file are computed utilizing the MD5 hashing algorithm.

6. The computer of claim 1, wherein generating the local copy of the virtualized application package further comprises:
   determining if an empty data block exists in the local copy of the virtualized application package;
   upon determining that an empty data block exists in the local copy of the virtualized application package, requesting the data block from a server computer containing an original copy of the virtualized application package; and
   upon receiving the data block from the server computer, copying the data block to the empty data block in the local copy of the virtualized application package.

7. The computer of claim 6, wherein the data block is requested from the server computer containing the original copy of the virtualized application package utilizing a file transfer service.

8. A computer-implemented method for generating a copy of a file package from one or more component files of the file package, wherein the file package comprises one or more data blocks containing a contents of the one or more component files, the method comprising:
   generating an empty copy of the file package on a local storage device of a computer from a skeleton file comprising a data block hash corresponding to each of the one or more data blocks in the file package, the data block hash computed from the contents of the corresponding data block in the file package, wherein the skeleton file does not contain the contents of the one or more data blocks and the empty copy of the file package comprises an empty data block corresponding to each data block hash in the skeleton file;
   for each of the one or more component files of the file package, dividing the component file into one or more blocks of data of a size less than or equal to a maximum block size;
   for each of the one or more blocks of data, computing a hash value from a contents of the block of data;
   searching the skeleton file for a data block hash matching the hash value computed for the block of data; and
   upon locating a matching data block hash in the skeleton file, copying the block of data to the empty data block of the empty copy of the file package corresponding to the matching data block hash from the skeleton file,
   wherein the file package further comprises one or more header blocks, wherein the skeleton file further comprises the one or more header blocks from the file package, and wherein generating the empty copy of the file package further comprises copying the one or more header blocks from the skeleton file to the empty copy of the file package.

9. The computer-implemented method of claim 8, wherein each of the one or more data blocks in the file package are compressed using a compression algorithm, and wherein the block of data is compressed using the compression algorithm before computing a hash value for the block of data.

10. The computer-implemented method of claim 8, wherein the hash value for the block of data and the data block hash in the skeleton file are computed utilizing the MD5 hashing algorithm.

11. The computer-implemented method of claim 8, wherein generating the copy of the file package further comprises:
   determining if an empty data block exists in the copy of the file package;
   upon determining that an empty data block exists in the copy of the file package, requesting the data block from a server computer containing an original, complete copy of the file package; and
   upon receiving the data block from the server computer, copying the data block to the empty data block in the copy of the file package.

12. A system for generating a local copy of a virtualized application package from and a virtual file system representation of a local installation of an application associated with the virtualized application package, the system comprising:
   a computer;
   a virtual application client executing on the computer and configured to stream the application from an original copy of the virtualized application package on a server computer and present one or more component files of the application through the virtual file system representation;
   the virtualized application package comprising one or more data blocks containing a contents of the one or more component files of the application;
   a skeleton file comprising a data block header and a data block hash pair corresponding to each of the one or more data blocks in the virtualized application package, the data block hash computed from the contents of the corresponding data block in the virtualized application package, wherein the skeleton file does not contain the contents of the one or more data blocks; and
   an application package generation module executing on the computer and configured to
   generate an empty copy of the virtualized application package on a local storage device of the computer from the skeleton file, the empty copy of the virtualized application package comprising an empty data block corresponding to each data block header and data block hash pair in the skeleton file,
   for each of the one or more component files of the application, divide the component file into one or more blocks of data,
   for each of the one or more blocks of data, compute a hash value for the block of data,
   search the skeleton file for a data block hash matching the hash value computed for the block of data; and
   upon locating a matching data block hash in the skeleton file, copy the block of data to the empty data block of the empty copy of the virtualized application package corresponding to the data block header and the data block hash pair from the skeleton file.

13. The system of claim 12, wherein the virtualized application package further comprises one or more header blocks, wherein the skeleton file further comprises the one or more header blocks from the virtualized application package, and wherein generating the empty copy of the virtualized application package further comprises copying the one or more header blocks from the skeleton file to the empty copy of the virtualized application package.

14. The system of claim 12, wherein each of the one or more data blocks in the virtualized application package are compressed using a compression algorithm, and wherein the block of data is compressed using the compression algorithm before computing a hash value for the block of data.

15. The system of claim 12, wherein the application package generation module is further configured to:
- determine if an empty data block exists in the local copy of the virtualized application package;
- upon determining that an empty data block exists in the local copy of the virtualized application package, request the data block from a server computer containing an original copy of the virtualized application package; and
- upon receiving the data block from the server computer, copy the data block to the empty data block in the local copy of the virtualized application package.

* * * * *